United States Patent
Peltomäki

[11] Patent Number: 5,712,845
[45] Date of Patent: Jan. 27, 1998

[54] METHOD FOR CONTROLLING CONDITIONAL CONNECTIONS IN A SYNCHRONOUS DIGITAL TELECOMMUNICATIONS SYSTEM

[75] Inventor: Arto Peltomäki, Espoo, Finland

[73] Assignee: Nokia Telecommunications Oy, Espoo, Finland

[21] Appl. No.: 513,983

[22] PCT Filed: Mar. 14, 1994

[86] PCT No.: PCT/FI94/00092

§ 371 Date: Sep. 13, 1995

§ 102(e) Date: Sep. 13, 1995

[87] PCT Pub. No.: WO94/22249

PCT Pub. Date: Sep. 29, 1994

[30] Foreign Application Priority Data

Mar. 16, 1993 [FI] Finland ................. 931164

[51] Int. Cl.[6] ........................... H04L 1/22
[52] U.S. Cl. ........................ 370/226; 370/400
[58] Field of Search ................. 370/16, 94.2, 99, 370/102, 216, 221, 225, 226, 400, 476, 505; 375/260, 267; 455/135, 8; 371/68.2; 340/825.01

[56] References Cited

U.S. PATENT DOCUMENTS

| | | | |
|---|---|---|---|
| 5,051,979 | 9/1991 | Chaudhuri et al. | 370/16 |
| 5,103,447 | 4/1992 | Takiyasu et al. | 370/85.15 |
| 5,151,902 | 9/1992 | Grallert | 371/51 |
| 5,172,376 | 12/1992 | Chopping et al. | 370/100.1 |
| 5,311,551 | 5/1994 | Eng | 375/267 |
| 5,428,612 | 6/1995 | Scheffel et al. | 370/99 |

FOREIGN PATENT DOCUMENTS

| | | |
|---|---|---|
| 0453876 | 10/1991 | European Pat. Off. . |
| 0455827 | 11/1991 | European Pat. Off. . |
| 0522748 | 1/1993 | European Pat. Off. . |
| 0563511 | 10/1993 | European Pat. Off. . |

OTHER PUBLICATIONS

CCITT Blue Book, Recommendation G.709: "Synchronous Multiplexing Structure", May 1990.
SDH—Ny Digital Hierarki, pp. 43–49, TELE Feb. 1990.

*Primary Examiner*—Benedict V. Safourek
*Attorney, Agent, or Firm*—Cushman Darby & Cushman Intellectual Property Group of Pillsbury Madison & Sutro LLP

[57] ABSTRACT

A method for controlling a conditional connection in a synchronous digital telecommunications system, in which a signal has a frame structure has a predetermined number of bytes of fixed length and includes a pointer indicating the phase of the payload within the frame structure. Condition information relating to a useful signal is transmitted, on the basis of which information the connection is made. In order to enable control of conditional connections in a synchronous digital telecommunications network without using the effective capacity of the network, the condition information is transmitted at least in one byte belonging to the overhead section of the frame structure.

7 Claims, 4 Drawing Sheets

METHOD FOR CONTROLLING CONDITIONAL CONNECTIONS IN A SYNCHRONOUS DIGITAL TELECOMMUNICATIONS SYSTEM

BACKGROUND OF THE INVENTION

The invention relates to a method for controlling conditional connections in a synchronous digital telecommunications system, such as the SDH or SONET system.

The current digital transmission network is plesiochronous, i.e. each 2 Mbit/s basic multiplex system has a dedicated clock independent of any other system. It is therefore impossible to locate a single 2 Mbit/s signal in the bit stream of a higher-order system, but to extract the 2 Mbit/s signal the higher-level signal has to be demultiplexed through each intermediate level down to the 2 Mbit/s level. For this reason, it has been expensive to construct especially branch connections requiring several multiplexers and demultiplexers. Another disadvantage of the plesiochronous transmission network is that equipments from two different manufacturers are usually not compatible.

The above drawbacks, among other things, have led to the introduction of the new synchronous digital hierarchy SDH specified in CCITT Recommendations G.707 to G.709 and G.781 to G.784. The synchronous digital hierarchy is based on STM-N transfer frames (Synchronous Transport Modules) located on several levels of hierarchy N (N=1,4,16 . . . ). Existing PCM systems, such as 2, 8 and 32 Mbit/s systems, are multiplexed into a synchronous 155.520 Mbit/s frame of the lowest level of the SDH (N=1). Consistently with the above, this frame is called the STM-1 frame. On the higher levels of hierarchy, the bit rates are multiples of the bit rate of the lowest level. In principle, all nodes of the synchronous transmission network are synchronized into one clock. If some of the nodes should, however, lose connection with the common clock, it would lead to problems in the connections between the nodes. The phase of the frame must also be easy to recognize in the reception. For the reasons stated above, the SDH telecommunications have introduced a pointer, which is a number indicating the phase of the payload within the frame, i.e. the pointer indicates that byte in the STM frame from which the payload begins.

FIG. 1 illustrates the structure of an STM-N frame, and FIG. 2 illustrates a single STM-1 frame. The STM-N frame comprises a matrix with 9 rows and N×270 columns so that there is one byte at the junction point between each row and column. Rows 1–3 and 5–9 of the N×9 first columns comprise a section overhead SOH, and row 4 comprises an AU pointer. The rest of the frame structure is formed of a section having the length of N×261 columns and containing the payload section of the STM-N frame.

FIG. 2 illustrates a single STM-1 frame which is 270 bytes in length, as described above. The payload section comprises one or more administration units AU. In the example shown in the figure, the payload section consists of an administration unit AU-4, into which a virtual container VC-4 is inserted. (Alternatively, the STM-1 transfer frame may contain three AU-3 units, each containing a corresponding virtual container VC-3). The VC-4 in turn consists of a path overhead POH located at the beginning of each row and having the length of one byte (9 bytes altogether), and of a payload section in which there are lower-level frames also comprising bytes allowing interface justification to be performed in connection with mapping when the rate of the information signal to be mapped deviates to some extent from its nominal value. (Mapping of the information signal into the transmission frame STM-1 is described e.g., in patent applications AU-B-34689/89 and FI-914746.

Each byte in the AU-4 unit has its own location number. The above-mentioned AU pointer contains the location of the first byte of the VC-4 container in the AU-4 unit. The pointers allow positive or negative pointer justifications to be performed at different points in the SDH network. If a virtual container having a certain clock frequency is applied to a network node operating at a clock frequency lower than the above-mentioned clock frequency of the virtual container, the data buffer will be filled up. This requires negative justification: one byte is transferred from the received virtual container to the overhead section of the frame to be transmitted while the pointer value is correspondingly decreased by one. If the rate of the received virtual container is lower than the clock rate of the node, the data buffer tends to be emptied, which calls for positive justification: a stuff byte is added to the virtual container to be transmitted and the pointer value is incremented by one.

FIG. 3 shows how an STM-N frame can be formed of existing bit streams in a plesiochronous transmission network. At the first stage, these bit streams (1.5, 2, 6, 8, 34, 45 or 140 Mbit/s, shown on the right in the figure) are packed into containers C specified by CCITT. At the second stage, overhead bytes containing control data are inserted into the containers, whereby the above-described virtual container VC-11, VC-12, VC-2, VC-3 or VC-4 is obtained (the first suffix in the abbreviations represents the level of hierarchy and the second suffix represents the bit rate). This virtual container remains intact while it passes through the synchronous network up to its point of delivery. The virtual containers are further formed (depending on the level of hierarchy) either into so-called tributary units TU or into AU units (AU-3 and AU-4), already mentioned above, by providing them with pointers. The AU unit can be mapped directly into the STM-1 frame, whereas the TU units have to be assembled through tributary unit groups TUG and VC-3 and VC-4 units to form AU units, which can then be mapped into the STM-1 frame. In FIG. 3, the mapping is indicated by a continuous thin line, the aligning with a broken line, and the multiplexing with a continuous thicker line.

As can be seen from FIG. 3, the STM-1 frame may be assembled in a number of alternative ways, and the contents of the highest-level virtual container VC-4, for instance, may vary, depending on the level from which the assembly has been started and in which way the assembly has been performed. The STM-1 signal may thus contain e.g., 3 TU-3 units, or 21TU-2 units, or 63 TU-12 units, or a combination of some of the above-mentioned units. As the higher-level unit contains several lower-level units, e.g. the VC-4 unit contains TU-12 units (there are 63 such units in a single VC-4 unit, cf. FIG. 3), the lower-level units are mapped into the higher-level frame by interleaving so that the first bytes are first taken consecutively from each one of the lower-level units, then the second bytes, etc. The example of FIG. 2 shows how the VC-4 unit contains at first consecutively the first bytes of all 63 TU-12 units, then the second bytes of all 63 TU-12 units, etc.

The above-described SDH frame structures and the assembly of such structures have been described, e.g. in References [1] and [2], which are referred to for a more detailed description (the references are listed at the end of the specification).

A problem encountered in the process of replacing a plesiochronous transmission network (PDH, Plesiochronous Digital Hierarchy) with a synchronous transmission network of the type described above is how to control conditional connections without using the effective capacity of the system.

In a plesiochronous transmission network, conditional connections are often controlled by means of a pilot channel, which e.g. in the European 30-channel basic multiplex system (2048 kbit/s) specified in CCITT Recommendation G.704 is typically formed by the c-bit of the time slot TS16 used for channel associated signalling. (The eight bits of the time slot TS16 are reserved for two signalling channels so that both of the channels can use four bits, generally represented by references a, b, c, d. However, in many signalling systems the c-bit is not in use and can be freely used for other purposes.) Such a method, however, requires channel associated signalling. In the case of common channel signalling or channel associated signalling where the c-bit is already in use, the pilot channel used for controlling conditional connections must be formed from another free bit, whereby the pilot channel uses the effective capacity.

SUMMARY OF THE INVENTION

The object of the present invention is to provide a method by which conditional connections can be controlled in a synchronous digital telecommunications network without using the effective capacity of the network.

The basic idea of the invention is to transmit condition information controlling conditional connections in the bytes belonging to the overhead sections (section and/or path overheads SOH/POH) of the frame structure. As the most common connection in practice is the connection on the TU-12 level (i.e. on the level of 2048 kbit/s basic multiplex system), the condition information is included according to the preferred embodiment of the invention in the path overhead (POH) of the VC-12 unit. When the condition information is transmitted in the path overhead of the VC-12 unit, connections on the TU-12 level affect both the data to be transmitted and the pilot channel (condition information) in the same way, i.e. the condition information uses exactly the same path as the useful signal.

In the following, the invention will be described in greater detail by way of example with reference to FIGS. 4 to 6 in the accompanying drawings, in which.

Figure 4:
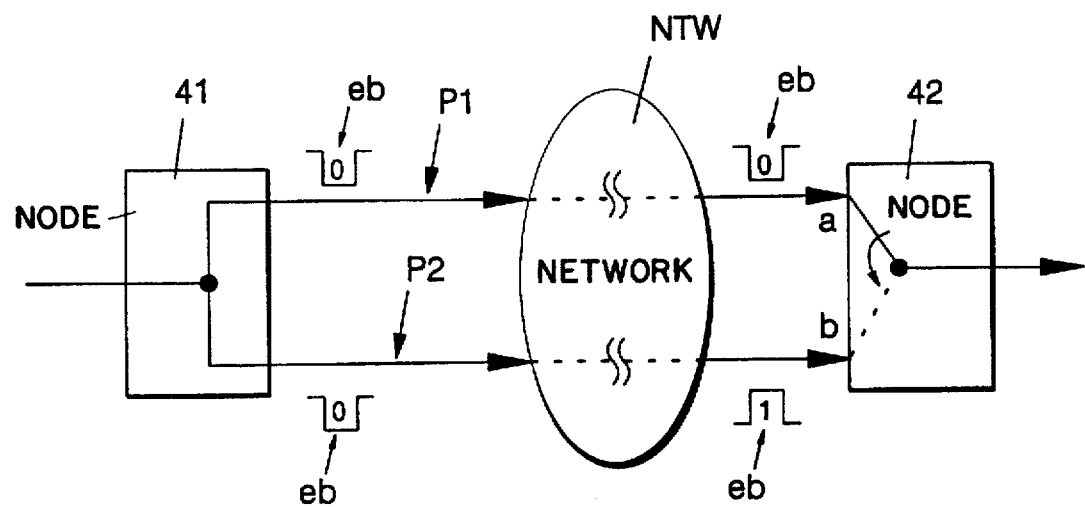
Figure 5:
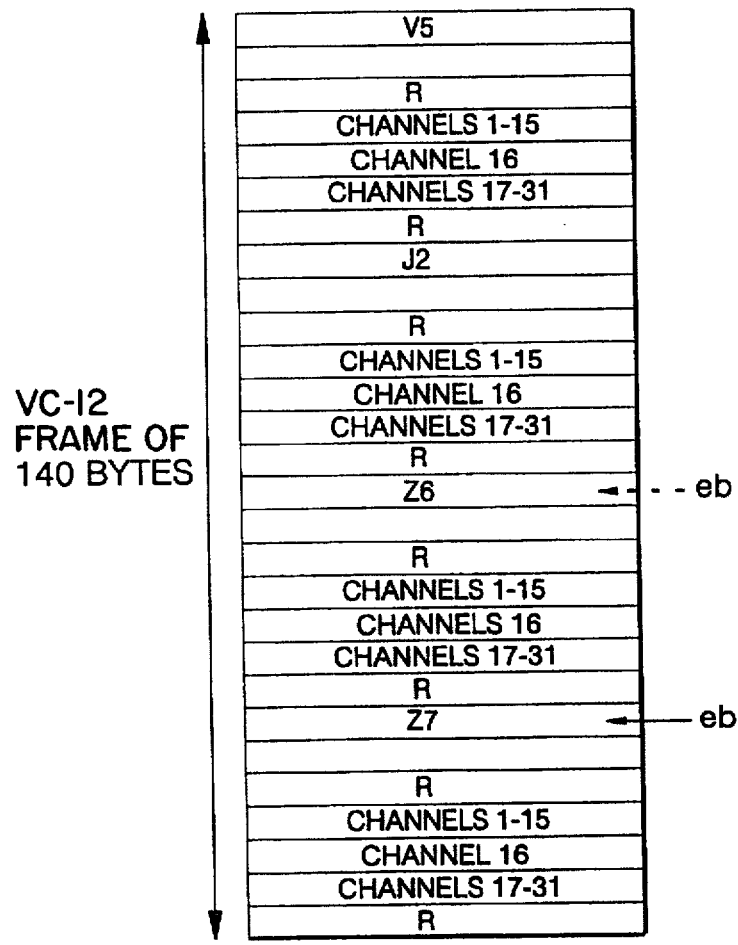
Figure 6:
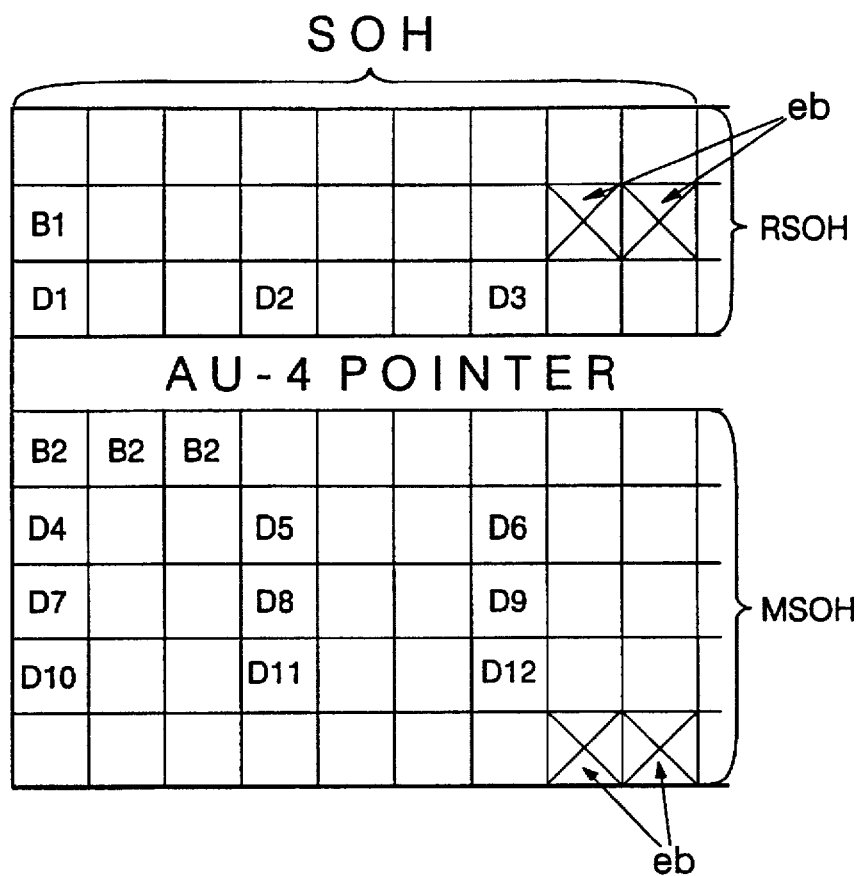

FIG. 4 illustrates the principle for controlling a conditional connection, the principle being already known apart from the method of the present invention, and FIG. 5 illustrates the preferred locations for condition information controlling a conditional connection in a VC-12 unit transmitted in an SDH network, and FIG. 6 illustrates the preferred locations for condition information controlling a conditional connection in the section overhead of an STM-1 frame.

DETAILED DESCRIPTION

FIG. 4 illustrates the principle for controlling a conditional connection. Node 41 transmits a signal via two different paths, indicated by P1 and P2. Node 42 (whose position in relation to node 41 is behind the network NTW) at the far end must select whether it connects forward the signal received from gate a or the one received from gate b. For the selection, the signal contains a condition bit eb, which is examined by node 42 at the far end. The figure illustrates, by way of example, a situation where the condition bit eb transmitted by node 41 is set to the value "zero" (true), the condition bit received by node 42 from path P1 is also set to "zero", and the condition bit received by node 42 from path P2 is set to "one". As the change in the value of the condition bit on path P2 indicates a fault on the path, node 42 selects the signal from gate a. At node 42 the different signals (or the corresponding gates) can be provided with priorities which indicate which signal (gate) is to be selected if the condition bits have the same values. If the signals (gates) have the same priority, it is also possible to select the signal in which the condition bit has longer had the same value.

FIG. 5 illustrates mapping of a 2048 kbit/s basic multiplex system to a VC-12 frame of 140 bytes (500 µs) in an SDH network. The first byte of the VC-12 frame which the pointer of the TU-12 unit indicates is byte V5. Mapping of this kind is specified in CCITT Recommendation G.709 (Reference 1). According to the invention, condition information is transmitted in a byte belonging to the path overhead (POH) of the VC-12 frame. Such bytes are (in addition to byte V5) bytes J2, Z6 and Z7, of which byte Z7 is the most preferred one for condition information, as at present its use is not specified in CCITT Recommendations. In accordance with FIG. 5, the condition bit eb is positioned in byte Z7. An alternative location, byte Z6, is indicated in the figure by a dotted arrow.

As each conditional connection requires only one bit, a byte can carry the condition information of eight conditional connections. The user defines which bit belongs to which conditional connection, and the connection made by the equipment depends on the states of the condition bits it receives, as stated above. A condition bit is transmitted in state "0" (e.g. node 41), and the condition obtains the value "true" when the receiver (e.g. node 42) receives the condition bit in state "0". If the condition of several connections is true, the connection to be made is selected on the basis of the priority of the connections, as stated in connection with FIG. 4. If none of the conditions is true, a continuous signal "1" is connected to the outgoing signal.

Figure 1:
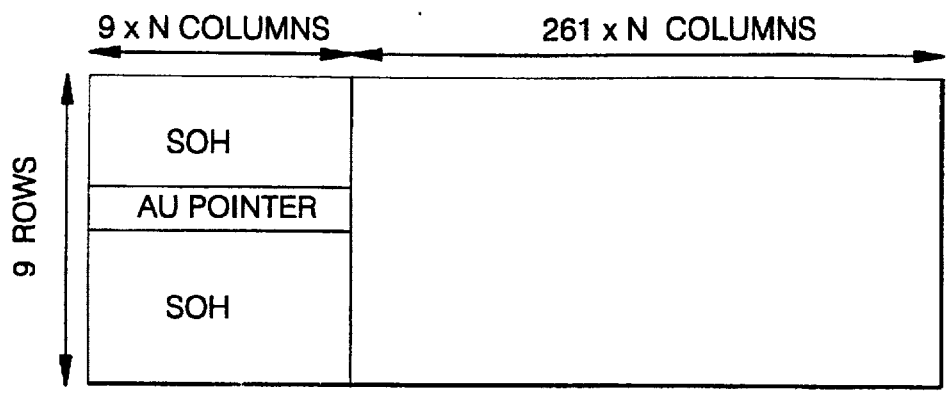
FIG. 1 illustrates the basic structure of a single STM-N frame.
Figure 2:
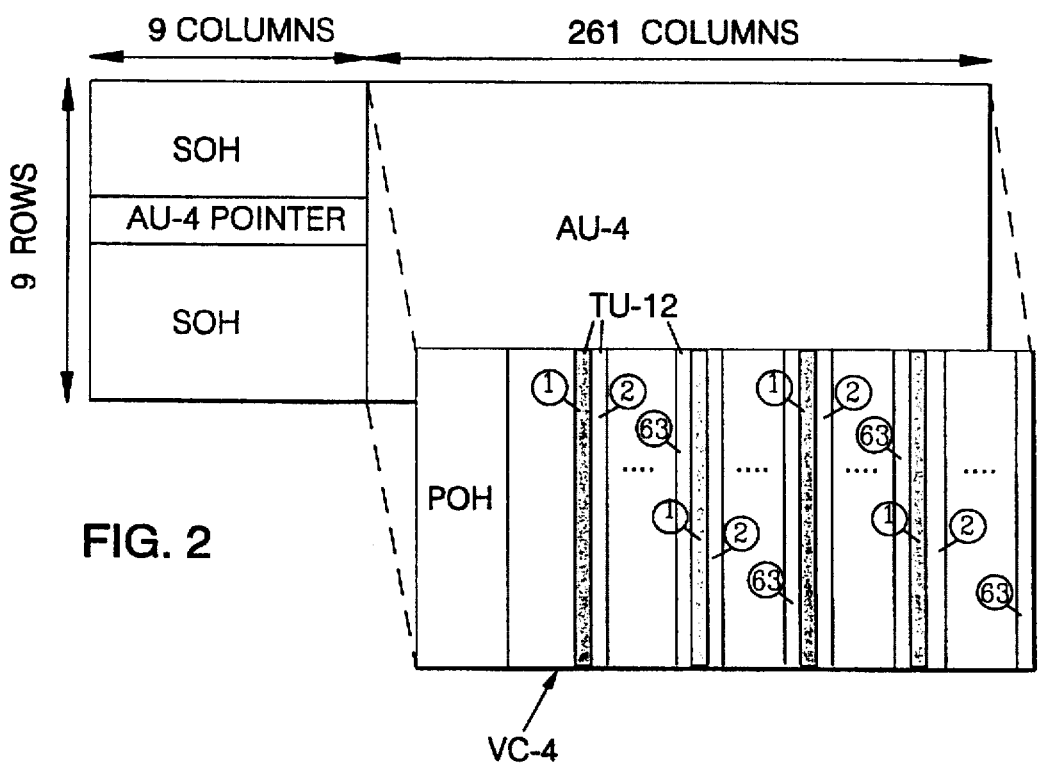
FIG. 2 illustrates the structure of a single STM-1 frame.
Figure 3:
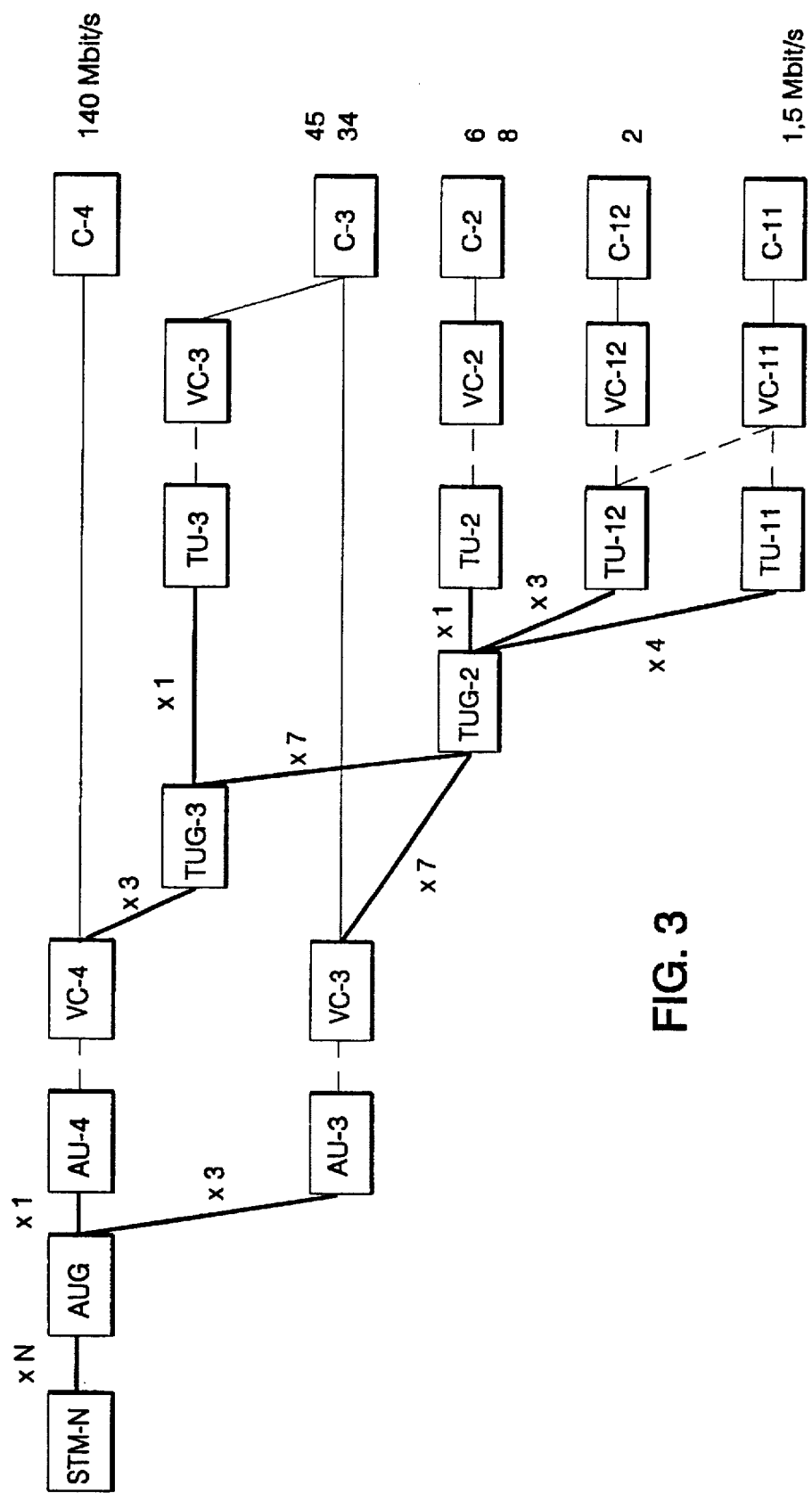
FIG. 3 illustrates the assembly of an STM-N frame from existing PCM systems.

FIG. 6 illustrates the section overhead SOH of an STM-1 frame and other possible locations for the condition bit eb when the connection takes place on a higher level of hierarchy (AU-4 level). The section overhead contains a regenerator part RSOH (Regenerator Section OverHead), which is formed by the three first rows, and a multiplexer part MSOH (Multiplexer Section OverHead), which is formed by the four bottom lines. The former is terminated at regenerator functions and the latter at the points where AUG units are assembled and disassembled (cf. FIG. 3). In the section overhead, bytes D1–D12, for example, form the 192 kbit/s and 576 kbit/s channels intended for network management. Bytes B1 and B2 are intended for controlling the error ratio of the line.

According to the present invention, condition information (condition bits) can be located, for instance, in bytes that are reserved for national use: the two last bytes of the second row, and the two last bytes of the ninth (the last) row. It is advantageous to locate condition information in bytes reserved for national use, as it is unlikely that they will be needed later for some other use which would prevent them from being used in accordance with the invention.

The bytes in the section overhead of an STM-1 frame can be used for transmitting condition information only when the bytes of the section overhead are transmitted with the actual useful signal. This is possible at least between two interconnected devices, i.e. over one communication link.

It is also possible to transmit condition information on the AU-4 level if there are so many conditional connections that there are no longer free bits in the path overhead of the VC-12 frame.

Even though the invention has been described above with reference to the examples shown in the accompanying drawings, it is obvious that the invention is not restricted to them but may be modified in various ways within the inventive idea disclosed above and in the appended claims.

REFERENCES

[1] CCITT Blue Book, Recommendation G.709: "Synchronous Multiplexing Structure", May 1990.

[2] SDH—Ny digital hierarki, TELE 2/90.

I claim:

1. A method for controlling conditional connections in a synchronous digital telecommunications network without using the effective payload-transmitting capacity of the network, for transmitting a signal from one node to another node via multiple possible alternative pathways existing along the network between the nodes, the signal having a frame structure in which each frame is constituted by a predetermined number of fixed length bytes organized into at least one payload section and at leats one overhead section, said sections having fixed relative locations from frame to frame and said at least one overhead section ikncluding a pointer indicating the phase of a payload within the frame structure, said method comprising:

designating at least one byte, each in a predetermined location in an overhead section of each frame for carrying condition information;

transmitting said signal from said one node to said other node along multiple ones of said possible alternative pathways, with condition information carried in at least one said predetermined location of at least one said frame of said signal;

at said other node, reading said condition information from frames of said signal as received from multiple ones of said pathways; and further transmitting along said network an instance of said signal as received along a one of said pathways selected based on said reading as indicating a given condition.

2. The method of claim 1, wherein:

each frame of the signal contains said condition information in at least one said predetermined location, and at said other node, each said location is subjected to said reading.

3. The method of claim 2, wherein:

said given condition is one indicative of absence of a fault on the respective pathway.

4. The method of claim 2, wherein:

said given condition is one indicative of a given-position bit of a given location byte having longest persisted in having a same value from frame to frame.

5. The method of claim 2, wherein:

each frame is a VC-12 frame and said condition information is carried in a path overhead byte of each said frame.

6. The method of claim 5, wherein:

said path overhead byte is byte Z7.

7. The method of claim 2, wherein:

each frame is an STM-1 frame and said condition information is carried in bytes reserved for national use of section overhead of each said frame.

* * * * *